W. E. STOUT.
SPRING TIRE.
APPLICATION FILED OCT. 9, 1920.
1,385,804.
Patented July 26, 1921.
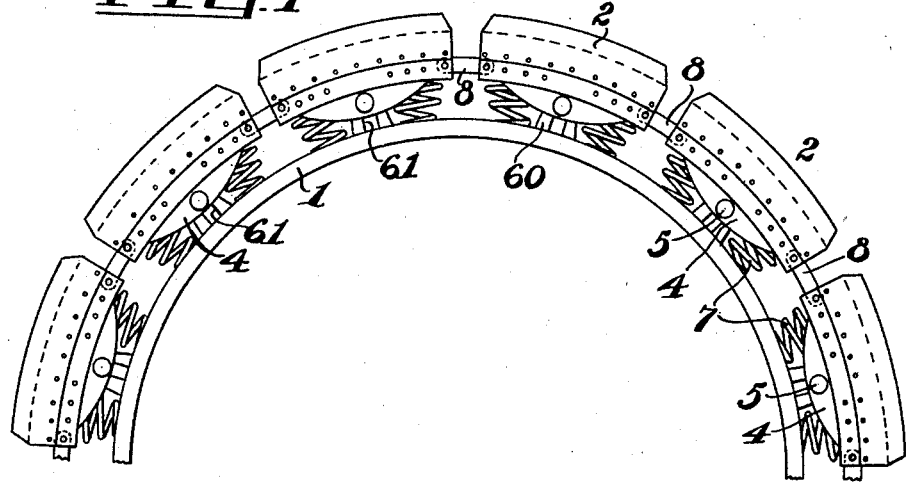
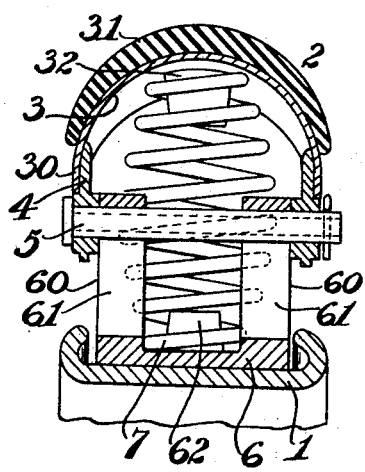
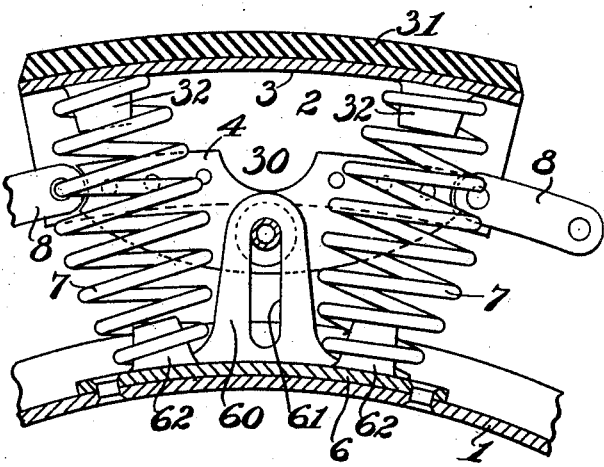
INVENTOR
William E. Stout
BY
H. L. & C. L. Reynolds
ATTORNEY

UNITED STATES PATENT OFFICE.

WILLIAM E. STOUT, OF SEATTLE, WASHINGTON.

SPRING-TIRE.

1,385,804. Specification of Letters Patent. Patented July 26, 1921.

Application filed October 9, 1920. Serial No. 415,824.

*To all whom it may concern:*

Be it known that I, WILLIAM E. STOUT, a citizen of the United States of America, and resident of the city of Seattle, in the county of King and State of Washington, have invented certain new and useful Improvements in Spring-Tires, of which the following is a specification.

My invention relates to resilient tires for vehicle wheels.

It is the object of my invention to provide a resilient tire which may be applied to and removed from wheel centers of the type commonly employed for the reception of removable rims carrying pneumatic tires. It is desired that this tire be treated in all respects as to application and removal, the same as the present removable rims.

The features of my invention which I believe to be new and upon which I desire to obtain the protection of a patent, will be hereinafter described and then particularly pointed out in the claim.

In the accompanying drawings I have shown my invention embodied in the type of construction which I now prefer.

Figure 1 is a side view of approximately one-half of a removable rim having my type of resilient tire thereon.

Fig. 2 is a cross section taken through the pivot axis of one of the sections.

Fig. 3 is a longitudinal section taken through the rim and one of the spring sections.

The novel features of my device are all combined in the rim of the wheel. This rim 1 is made of the same size as the removable rims which carry pneumatic tires and is designed to be placed upon the same wheel center as that to which the pneumatic tires are secured and to be secured in the same manner. The mechanism of the wheel center and the manner of securing the rim in place has not been shown, as it is contemplated that these shall be of any approved standard form and do not, strictly speaking, form a part of my present invention.

About the wheel center is secured a removable rim carrying a series of spring tread sections. These spring tread sections 2 are alike in construction and a description of one will suffice for the others. Each of these sections has an outwardly placed member which is of the nature of a short section of a tire. This may, in cross-section be of the semi-circular shape indicated in Fig. 2, or of any other outline which is found desirable. I prefer that it shall have inwardly projecting side flanges or flanks, as 30, in order to give the same sufficient strength to resist bending. It may be and in most cases would preferably be, provided with an outer tread layer 31 of rubber or other suitable material.

To each of these sections 3 is secured a pair of yokes 4, which at the center of their length are provided with eyes for the reception of a pivot axis or bolt 5, which bolt extends transversely of the rim. A base plate 6 is secured to the rim 1 which forms the base and main frame of the removable rim. This base plate 6 has two ears 60 located one at each side thereof, which project outward and are separated from each other a distance so that they will fit snugly between the yokes 4 at opposite sides of the tread section. Each of these ears 60 is provided with a radially extending slot 61 through which the pivot axis of the bolt 5 passes.

Springs 7 are placed between the base plate 6 and the outer tread plate 3, and hold this outer tread plate away from the rim 1. The base plate 6 is provided with bosses, as 62, and the outer or tread plate 3 with corresponding bosses 32, over which the ends of the springs are placed to retain them in position and prevent slipping.

In order to permit each of the spring sections 2 to assist in supporting adjacent spring sections, I have provided links, as 8, which pivotally connect adjacent ends of these sections. This binds them together to resist movement in a periphral direction and also that the springs of one section will, to a certain extent, assist in preventing undue compression of the adjacent springs of adjacent sections.

It is evident that for heavy duty service, the number of rows of springs may be increased as the width of the tire is increased. This I consider as mere duplication and have therefore not illustrated the same, confining the illustration to a tire having a single row of springs. I have also shown a spring which is of the shape of a conical helix having a double cone. It is evident that any other shape and style of spring may be subtituted if it be found to be better adapted to stand the strains to which these springs are subjected.

The above type of removable rim and resilient tire may be carried as a spare tire, to replace a pneumatic when the latter becomes punctured, or it may be used as a standard equipment. It is removable and adapted to be placed upon a standard wheel center in the same manner as a pneumatic tire.

What I claim as my invention is:

A spring tire for vehicles comprising a rim adapted to fit a wheel center, tread sections each comprising a transversely concaved plate longitudinally curved to form a segment of a circle and having a tread surface of a compressible elastic material as rubber, yokes having pivot eyes and secured to the inner sides of the said concaved plate, a pivot bolt connecting the pivot eyes at opposite sides, a plate secured to the rim and having side lugs provided with radially positioned slots receiving said pivot pin, said rim plate and the tread plate having spring retaining bosses toward their ends and helical springs having their ends surrounding said bosses.

Signed at Seattle, King county, Washington, this 2nd day of October, 1920.

WILLIAM E. STOUT.